(12) United States Patent
Harrison et al.

(10) Patent No.: US 8,430,718 B2
(45) Date of Patent: Apr. 30, 2013

(54) DEBURRING MEDIUM AND PROCESS

(75) Inventors: Philip James Harrison, Bradford (GB);
Steven Bradley Vaughan, Bradford (GB)

(73) Assignee: Vibraglaz (UK) Limited (GB)

( * ) Notice: Subject to any disclaimer, the term of this patent is extended or adjusted under 35 U.S.C. 154(b) by 398 days.

(21) Appl. No.: 12/677,357

(22) PCT Filed: Sep. 12, 2008

(86) PCT No.: PCT/GB2008/050821
§ 371 (c)(1),
(2), (4) Date: Sep. 7, 2010

(87) PCT Pub. No.: WO2009/034392
PCT Pub. Date: Mar. 19, 2009

(65) Prior Publication Data
US 2011/0009032 A1    Jan. 13, 2011

(30) Foreign Application Priority Data
Sep. 13, 2007   (GB) .................................. 0717849.4

(51) Int. Cl.
*B24B 1/00*    (2006.01)
(52) U.S. Cl.
USPC ............. 451/35; 451/108; 451/113; 65/17.3
(58) Field of Classification Search ............ 451/35; 51/308; 65/17.3, 33.1, 33.5, 33.6
See application file for complete search history.

(56) References Cited

U.S. PATENT DOCUMENTS

| | | | | |
|---|---|---|---|---|
| 3,113,878 A | * | 12/1963 | Martin | 501/5 |
| 3,368,712 A | * | 2/1968 | Sanford et al. | 428/544 |
| 3,405,002 A | * | 10/1968 | Martin | 428/428 |
| 3,808,747 A | | 5/1974 | Kenagy | |
| 3,819,387 A | | 6/1974 | Leger et al. | |
| 3,820,968 A | * | 6/1974 | Haisty | 5/33.2 |
| 4,110,085 A | | 8/1978 | Balz | |
| 4,938,788 A | * | 7/1990 | Segawa et al. | 65/404 |
| 5,053,359 A | * | 10/1991 | Loxley et al. | 501/4 |
| 5,637,030 A | * | 6/1997 | Chopra et al. | 451/39 |
| 5,785,579 A | * | 7/1998 | Grondin | 51/307 |
| 5,935,885 A | * | 8/1999 | Hnat et al. | 501/1 |
| 5,981,413 A | * | 11/1999 | Hale | 501/32 |
| 6,261,386 B1 | * | 7/2001 | Perepezko et al. | 148/302 |
| 6,312,775 B1 | * | 11/2001 | Nagata et al. | 428/34.6 |
| 6,381,987 B1 | * | 5/2002 | Werdecker et al. | 65/17.5 |
| 6,551,366 B1 | | 4/2003 | D'Souza et al. | |
| 6,672,107 B2 | * | 1/2004 | Werdecker et al. | 65/17.4 |
| 6,869,334 B1 | * | 3/2005 | Leyendecker et al. | 451/38 |
| 7,090,733 B2 | * | 8/2006 | Munir et al. | 148/561 |
| 2003/0180537 A1 | * | 9/2003 | Meyer | 428/404 |
| 2004/0144132 A1 | * | 7/2004 | Reznik et al. | 65/17.3 |
| 2004/0148966 A1 | | 8/2004 | Celikkaya et al. | |
| 2004/0148967 A1 | | 8/2004 | Celikkaya et al. | |
| 2007/0151166 A1 | | 7/2007 | Endres et al. | |
| 2007/0237935 A1 | * | 10/2007 | Mori et al. | 428/210 |
| 2009/0025424 A1 | | 1/2009 | Rosenflanz | |

FOREIGN PATENT DOCUMENTS

| | | |
|---|---|---|
| EP | 1 495 236 B1 | 8/2005 |
| WO | WO 01/85393 A1 | 11/2001 |

* cited by examiner

*Primary Examiner* — George Nguyen
(74) *Attorney, Agent, or Firm* — Myers Bigel Sibley & Sojovec, P.A.

(57) ABSTRACT

A vibratory finishing medium element having at least a portion comprising a devitrified material.

28 Claims, 6 Drawing Sheets

DEBURRING MEDIUM AND PROCESS

RELATED APPLICATIONS

The present application is a 35 U.S.C. §371 national phase application of PCT International Application No. PCT/GB2008/050821, having an international filing date of 12 Sept. 2008, claiming priority to Great Britain Patent Application No. 0717849.4, filed 13 Sept. 2007. The disclosures of each application are incorporated herein by reference in their entireties. The above PCT International Application was published in the English language and has International Publication No. WO 2009/034392A1.

FIELD OF THE INVENTION

The present invention relates to finishing media, and to a process of finishing an article. In particular but not exclusively the invention relates to a finishing medium for use with vibratory finishing apparatus.

BACKGROUND

It is known to use vibratory finishing processes for removing burrs and smoothening the surfaces of mass-produced articles. Burrs may be present on an article for a variety of reasons. In particular, the surfaces of parts produced by metal casting, machining and general processing frequently have burrs and a roughness that is not acceptable in the final product.

Finishing of an article may involve removal of burrs and reduction of the roughness of a surface of the article.

Articles to be finished are typically placed in a vibratory finishing apparatus such as barrelling or rumbling apparatus, a vibratory trough or bowl, a centrifuge or drag-finisher, together with elements of a finishing medium. A polishing or degreasing compound may also be added.

In the case of deburring of an article, the finishing medium typically has a relatively rough surface, whilst in the case of polishing of an article, the finishing medium typically has a relatively smooth surface.

During the finishing process, the finishing medium is agitated, causing the elements of the medium to impinge against the articles to be finished. One or more compounds such as liquid soaps, degreasant, polish etc may be provided together with the finishing medium.

A number of different types of finishing apparatus are known. One such type is the tumbling mill. A tumbling mill is configured to finish articles by means of a 'tumbling' action of elements of the finishing medium on the articles.

The finishing medium itself typically comprises articles having sharp points or corners. The medium may alternatively or in addition have embedded particles of an abrasive material. Some finishing materials are in the form of fired china clay with aluminium oxide particles embedded therein. In the case of finishing materials in the form of a plastics material, quartz particles may be added.

During the finishing process, the sharp points or corners and/or embedded particles exposed at a surface of the medium find their way into grooves and crevices of the article, thereby smoothening the article. In some cases, the finishing medium has a cleaning effect on the article instead of or in addition to a smoothening effect.

The problem exists that during the finishing process sharp points, edges or corners of the elements of the finishing medium are quickly abraded and worn. Consequently, the elements are no longer capable of reaching into grooves and crevices to finish the article efficiently.

U.S. Pat. No. 3,375,615 discloses a finishing tumbling medium in the form of triangular or star-shaped plates having apertures formed therethrough. The apertures are formed close to apices of the plates. Sharp edges of the media are provided, at the apices, in order to promote finishing. In order to prolong the useful life of the finishing medium, the medium is arranged to fracture in use when it has worn to a predetermined degree. The medium is arranged to fracture in the region of the apertures, thereby providing fresh sharp edges for finishing.

The medium is disclosed to be formed either of substantially 100% inorganic ceramic or of a combination of ceramic abrasive particles and a vitreous or plastic resin binder that binds the particles together.

Ceramic media have the disadvantage that they are costly to produce and need to have an abrasive added in order to effect a cutting action.

GB1130923 discloses finishing media in the form of articles having a star-shaped cross-section, and a length greater than the maximum dimension of the star-shaped cross-section. The medium is disclosed to be formed either from a zinc based die casting material, steel, aluminium, brass or a ceramic material.

Ceramic materials have the disadvantage that once they have worn, they must be discarded since it is not easy to reuse such materials. Metallic materials on the other hand are capable in many cases of being reformed by melting and recasting.

However, when metallic finishing media are used to finish metallic workpieces, the medium tends to lose its sharp edges relatively quickly compared with harder materials such as ceramics. Consequently, metallic vibratory finishing media tend to be carbide based. Carbide based materials have the disadvantage that they are relatively costly to produce.

Further disadvantages of metallic finishing media include the fact that such media are relatively difficult to machine and mass produce. The materials also tend to corrode rapidly in wet processing environments, especially where acidic compounds are used.

Consequently, in some cases, finishing media are not utilised at all. Rather, components are subjected to 'self processing' conditions. In other words, the components are left to move against themselves in the vibratory finishing environment, with no finishing medium added. Such conditions are typically utilised only in the case of high volume, low quality parts needing very little deflashing or deburring. Self-finishing processes can result in damage to components during the finishing process.

U.S. Pat. No. 5,373,047 discloses a blasting medium of a thermoplastically processable polymer granulate filled with finely divided metal, the metal particles being coated with an adhesion promoter. Polymer vibratory media have the disadvantage that they present a not insignificant carbon footprint, they are relatively difficult to produce, and they are not easy to recycle.

US2004/0148966 discloses methods of making glasses and glass-ceramics comprising Al2O3 and SiO2 and discloses that glass-ceramic particles can be useful as abrasive particles. The document discloses embedding glass-ceramic particles in a host matrix to form an abrasive article such as a grinding wheel. In one embodiment particles are bonded by means of a binder to a fibrous mat provided on a substrate.

Furthermore, finishing medium elements may be formed as discrete components not requiring support by a matrix such as the fibrous mat of US2004/0148966 (see above).

In a first aspect of the present invention there is provided a vibratory finishing medium element having at least a portion comprising a devitrified material.

In some embodiments the finishing medium elements consist essentially of a material that is at least partially devitrified. In some embodiments the finishing medium elements consist essentially of a glass material that has been partially devitrified. In other words, in some embodiments the finishing medium elements do not comprise at least partially devitrified material particles in a host matrix such as a ceramic matrix, polymer matrix or any other kind of matrix, but instead are formed substantially entirely of at least partially devitrified material, preferably glass material.

In some embodiments the finishing medium elements consist of a glass material that has been at least partially devitrified.

In some embodiments the finishing medium elements are formed essentially and almost exclusively from glass material that has been subsequently subjected to a heat treatment to form a partially devitrified material. In some embodiments the finishing medium elements are formed exclusively from glass material that has been subsequently subjected to a heat treatment to form a partially devitrified material Embodiments in which the elements are formed essentially or exclusively from glass material are especially advantageous over prior art media comprising matrix elements with embedded abrasive particles such as aluminium oxide or the like. This is because the prior art elements tend to shed their abrasive particles during use, forming a slurry of abrasive particles, matrix components and cuttings from the article that is being finished. This slurry can be environmentally problematic for certain abrasive particles, and may need further, expensive processing before it can be disposed of. In contrast, embodiments of the present invention shed only glass particles, which can easily be disposed of or recycled.

By devitrified is meant a material having a crystalline structure that formerly had an amorphous (glassy) structure. By amorphous structure is meant a material that lacks any long range crystal structure as determined by X-ray diffraction. By glass or glassy is meant an amorphous material exhibiting a glass transition temperature.

A finishing medium according to the present invention has the advantage that it may be fabricated from relatively low cost starting materials and in a relatively low cost manner. Elements according to one or more embodiments of the invention are fabricated from recycled glass material.

The raw materials from which ceramics are obtained (such as china clay) are typically obtained by mining operations and consequently environmental concerns exist in respect of the use of this material. The use of a recycled material, however, has the advantage that disturbance of a landscape due to a mining operation is not required.

In particular, green (or brown) glass is not normally recycled. Therefore embodiments of the present invention provide an excellent use for this material which is otherwise disposed of at landfill sites or other waste disposal facilities.

Preferably the finishing medium element comprises silica.

Preferably the volume of the element in the form of devitrified material is in the range from around 1% to around 100%.

More preferably, the volume of the element in the form of devitrified material may be in the range from around 20% to around 80%.

It is found that the higher the proportion of devitrified material, the harder the finishing element. In some embodiments the finishing element has a hardness of around 5.5 mohs.

If the hardness is excessively high, finishing elements are at risk of suffering fracture during use. If an element is excessively soft, the element is at risk of losing its effectiveness due to rounding of edges of the element.

Preferably an element has a longest dimension in the range from about 5 mm to about 80 mm.

An element may have a longest dimension in the range from about 5 to about 50 mm.

An element may have a longest dimension in the range from about 10 to about 40 mm.

Elements with dimensions in these ranges have been found to be particularly suited to finishing articles over a range of different sizes. Furthermore, a size of an element may be selected so that the element is likely to be able to be able to impinge upon all required surfaces of the article without becoming lodged in a recess or crevice or other feature of an article.

Preferably an element is provided in the shape of at least one selected from amongst a cuboid, an ellipsoid, a prism, a cone, a tetrahedron, a pyramid, a polyhedral solid and a sphere.

The element may comprise or incorporate a plurality of voids formed, for example, by gas bubbles, preferably air bubbles.

The voids may be substantially uniformly dispersed within the element, or may be located in at least a surface layer thereof.

The voids have a nominal diameter in the range of from around 1 micron to around 1 mm, preferably around 10 microns to around 500 microns, more preferably around 100 microns to around 500 microns. In some embodiments the voids are of a size in the range of from around 50 nm to around 5 mm.

The voids, when exposed on surface regions of the element, present sharp edges that are well-sized for cutting and deburring and finishing. The exposed voids can also act as reservoirs for fluid finishing media that may be used in a vibratory finishing process.

Preferably the element has a plurality of regions of a crystalline material at a free surface of the element.

Preferably the element consists essentially of at least partially devitrified material, preferably at least partially devitrified glass material.

In a second aspect of the invention there is provided a method of forming a finishing medium element comprising the steps of: providing at least one piece of a material comprising a glass portion; subjecting the at least one piece to a heat treatment thereby to form a solid cast member having at least a portion comprising a devitrified material.

By glass portion is meant a portion formed from an amorphous or glassy material.

Preferably the step of providing at least one piece of material comprises the step of providing a plurality of pieces of material, for example pieces of broken glass in the form of glass cullet (reclaimed glass).

Preferably the plurality of pieces of material have an average size in the range of up to around 4 mm.

The plurality of pieces of material may have an average size in the range from around 4 mm to around 2 mm.

The plurality of pieces of material may have an average size in the range from around 3 mm to around 1 mm.

The plurality of pieces of material may have an average size in the range from around 1.5 mm to around 0.75 mm.

The plurality of pieces of material may have an average size in the range of from around 1.5 mm to around 500 microns.

The plurality of pieces of material may have an average size in the range of up to 100 microns.

It is generally found that the smaller the average size of the pieces from which a finishing element is made, the smoother the surface of the finished article. Elements made from pieces having an average size at the lower end of the range are particularly well suited to finishing articles such that the finished article has a relatively low surface roughness.

Preferably the cast member further comprises amorphous glass material.

The presence of amorphous glass material may have the effect of increasing a toughness of the element. In other words, the presence of amorphous glass material may reduce a propensity of the material to fracture.

Preferably the method further comprises the step of cutting the cast member thereby to form a plurality of finishing medium elements.

Cutting of the cast member may be performed by means of a standard saw such as a diamond tipped circular saw. Alternatively or in addition cutting may be performed by means of laser cutting apparatus and/or water jet cutting apparatus.

Preferably the step of heat treating the at least one piece is preceded by the step of placing the at least one piece in a mould, the mould having a shape corresponding to a shape of a finishing medium element. The mould may comprise a plurality of moulds formed in a tray, similar to a muffin tray, where cones are formed, elements with a cone angle of 30° C., 60° C., 90° C. and up to 120° C. have been found to be useful.

Preferably the finishing medium element is formed in the shape of at least one selected from amongst amongst a cuboid, an ellipsoid, a prism, a cone, a tetrahedron, a pyramid, a polyhedral solid and a sphere.

Preferably the step of heat treating comprises the step of heating to a temperature in the range from about 700° C. to about 1100° C.

More preferably, the step of heat treating comprises the step of heating to a temperature in the range from about 800° C. to about 1000° C.

Still more preferably, the step of heat treating comprises the step of heating to a temperature in the range from about 850° C. to about 950° C., preferably from about 900° C. to about 920° C., more preferably around 900° C.

The step of heat treating may comprise heating to a temperature in the range from about 700° C. to about 1100° C. for a period of from around 1 hour to around 3 hours, more preferably from around 700° to around 950° C., still more preferably heating to a temperature of around 900° C. for a period of from around 1 hour to around 3 hours, more preferably around 2 hours.

Preferably the step of heat treating comprises the step of heating to a temperature in the range from about 700° C. to about 1100° C. for a period of around 2 hours.

A material formed following processing of a glass material to form vibratory finishing media may have a hardness value of around 5.5 mohs.

The step of heat treating may comprise the step of heat treating the at least one piece thereby to melt at least a portion of said at least one piece; subsequently cooling to form a solid cast member having at least a portion comprising a devitrified material.

In a third aspect of the invention there is provided a method of forming a finishing medium element comprising the steps of: providing at least one piece of a material comprising a glass portion; heat treating the at least one piece thereby to melt at least a portion of said at least one piece; subsequently cooling to form a solid cast member having at least a portion comprising a devitrified material.

In a fourth aspect of the invention there is provided a method of reforming at least one finishing medium element comprising the steps of: providing at least one finishing medium element according to the first aspect; performing a heat treatment; subsequently, cooling to form a solid cast member comprising a devitrified material.

This has the advantage that spent finishing elements may be reformed to produce fresh finishing elements. There is therefore no requirement to dispose of spent finishing elements in a landfill or other waste disposal facility.

Preferably the step of providing the at least one finishing medium element further comprises the step of fracturing the at least one finishing medium element thereby to form a plurality of pieces of material.

The step of fracturing the at least one finishing medium element may be followed by the step of placing at least one of said plurality of pieces of material in a mould.

In a fifth aspect of the invention there is provided a method of reforming at least one finishing medium element comprising the steps of: providing at least one finishing medium element according to the first aspect of the invention; performing a heat treatment thereby to melt at least a portion of said element; subsequently, cooling to form a solid cast member comprising a devitrified material.

In a sixth aspect of the invention there is provided a finishing medium element according to the first aspect in combination with a degreasant and/or a polishing compound.

In a seventh aspect of the invention there is provided a method of finishing an article comprising the steps of: providing a plurality of finishing medium elements according to the first aspect; and causing a plurality of the finishing medium elements to impinge against an article thereby to reduce a surface roughness of the article.

Preferably the method further comprises the steps of: providing at least one selected from amongst a degreasing or cleaning or polishing compound thereby to enhance a reduction in surface roughness of the article during the finishing process.

Embodiments of the invention will now be described with reference to the accompanying figures in which.

According to a first embodiment of the invention, a finishing medium is formed from partially recrystallised silica glass material. Other glass materials are also useful.

Amorphous silica glass is widely available as a commodity material at relatively low prices in comparison to metallic materials. For example, amorphous silica glass is available in the form of recycled beverage bottles and other recycled articles.

According to a method of making a finishing medium according to embodiments of the present invention, a starting material in the form of amorphous silica glass is crushed into small pieces. In some embodiments of the invention the pieces are around 4 mm in diameter. By 'diameter' is meant a maximum dimension of a piece of material.

In some embodiments, graded mixed cullet is used, having pieces having a maximum dimension of around 4 mm.

In some embodiments pieces having a larger diameter are used. For example, pieces having a diameter of up to around 5 mm may be used.

In some embodiments, pieces having a diameter of from a few microns to around 5 mm are used.

According to the first embodiment the crushed pieces are placed in a mould substantially in the shape of a cuboid and subjected to a heat treatment. The heat treatment is such that the crushed pieces are at least partially melted, before being cooled to form a material having at least a portion comprising a devitrified silica material. Devitrified silica has the property that it is relatively hard and resistant to wear by abrasion.

The cooled material has both regions of amorphous material and regions of devitrified, crystallised silica material. The crushed glass starting material, on the other hand, is typically almost entirely composed of amorphous silica material.

Figure 1:
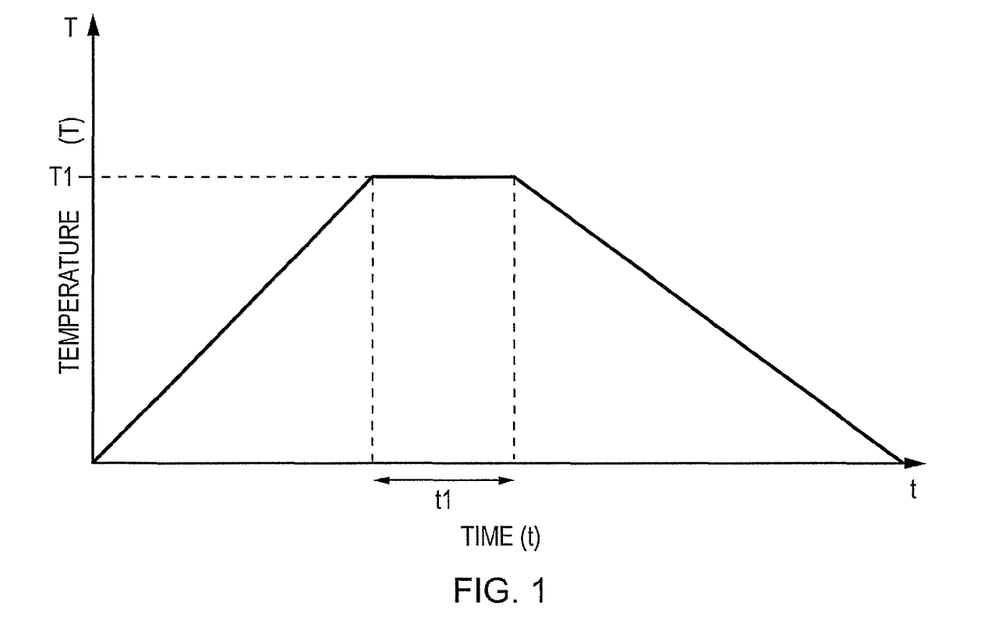
FIG. 1 is a plot of temperature as a function of time for a heat treatment according to first and second embodiments of the invention.
Figure 2:
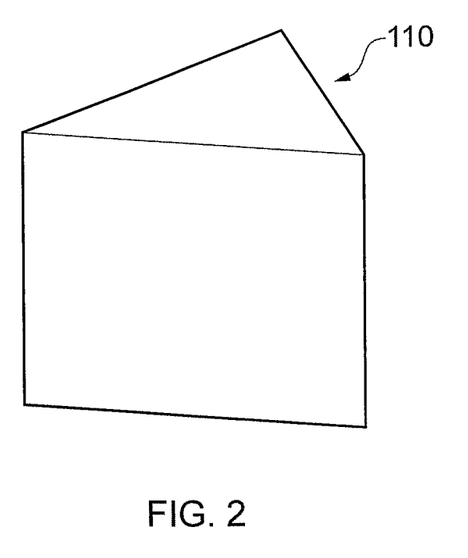
FIG. 2 shows a prism-shaped finishing medium element according to a first embodiment of the invention.

A plot of temperature as a function of time for the heat treatment process is shown schematically in FIG. 1.

The crushed pieces are heated to a temperature T1 of from around 700° C. to around 1400° C. The pieces are held at this temperature for a period of time t1 of from around 1 to around 6 hours.

In a preferred embodiment of the invention the crushed pieces are heated to a temperature T1 of around 900° C. for a period t1 of around 2 hours. In some embodiments the crushed pieces are heated to a temperature T1 of around 925° C.

The degree of recrystallisation experienced by the glass material during cooling from elevated temperature T1 determines to a substantial extent the hardness of the resulting finishing medium. The time t1 and temperature T1 used will influence the proportion of crystalline material comprised in the finishing media. A higher proportion of crystalline material is typically found to result in a finishing medium of increased hardness.

Finishing media containing a higher proportion of crystalline material also have increased brittleness, which may result in fracture during the finishing process. An acceptable balance between the relative proportions of amorphous and crystalline material must therefore be achieved, in order to obtain a finishing medium sufficiently hard not to wear at too high a rate, whilst being sufficiently tough not to fracture too easily during a finishing process.

Once the partially recrystallized glass material has been cooled to room temperature, it is cut to form elements of a shape and size suitable for use as a finishing medium. Cutting is typically performed using a conventional diamond tipped circular saw blade.

In some embodiments of the invention cutting is performed by means of a water-jet or a laser.

According to the first embodiment of the invention the material is cut to form prism-shaped finishing media as shown generally at 110 in FIG. 1. According to the first embodiment, a length of a side of a base of each pyramid is in the range from about 5 mm to about 50 mm. In some embodiments the range is from about 10 mm to about 40 mm.

The size of the media is selected according to a size and shape of articles to be finished. The size is selected to avoid a problem of jamming of finishing media elements in a recess or other formation of an article to be finished.

According to the first embodiment of the invention the finishing media are in the form of solid prismatic pieces formed by cutting from a block of partially devitrified material.

In alternative embodiments, the material is cut to form a different shape, such as a cube, a cuboid, an ellipsoid, a body having a cross-section or other portion in the form of a star, or any other suitable shape.

According to a second embodiment of the invention, finishing media are formed by melting particles of crushed silica glass within individual moulds so as to form finishing media of the required final shape directly. It is therefore not necessary to cut the solidified melt in order to form finishing medium elements.

Figure 3:
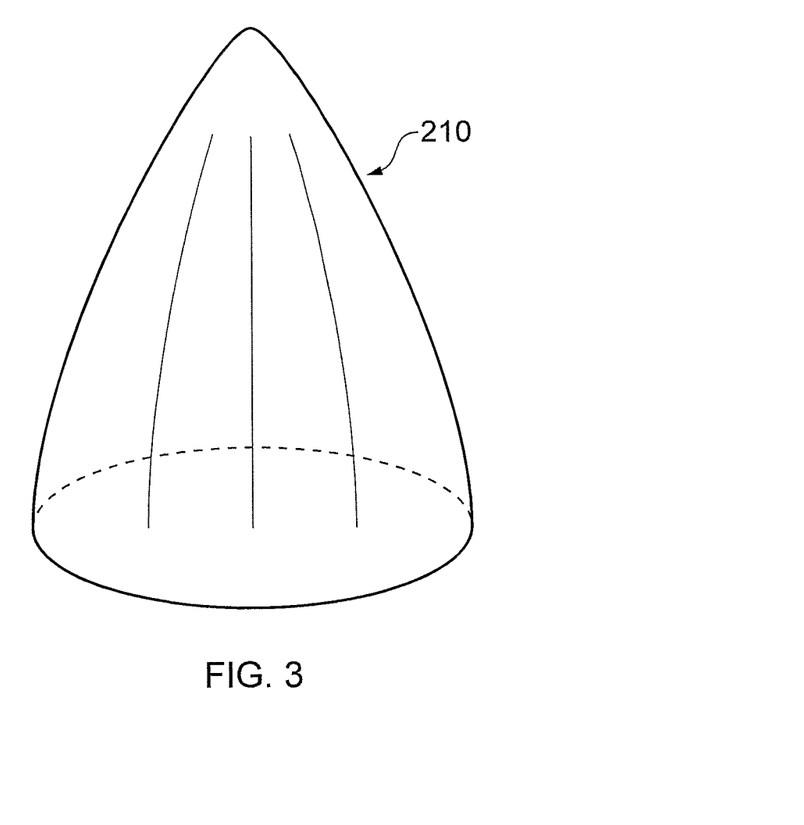
FIG. 3 shows a substantially conical-shaped finishing medium element according to a second embodiment of the invention.
Figure 4:
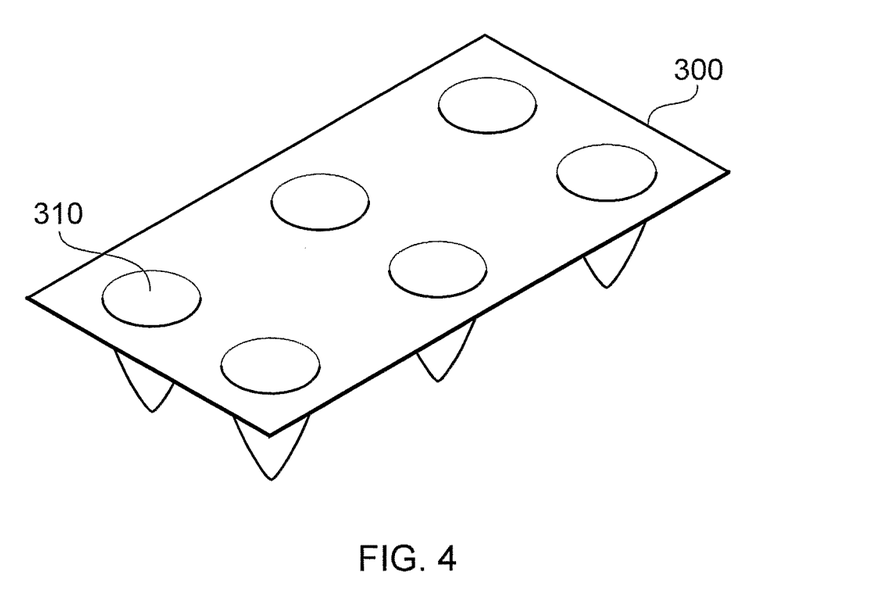
FIG. 4 shows a mould suitable for forming a plurality of finishing medium elements according to the second embodiment of the invention.

FIG. 3 is a schematic illustration of a finishing medium element 210 having a substantially conical shape that was formed directly from a mould. A suitable mould for forming such elements 210 is shown in FIG. 4. The mould is provided with a plurality of well elements 310 of a shape corresponding to that of the conical finishing medium element 210.

Finishing media of conical shape have the advantage that they are readily removed from a mould once the cast material has cooled. Thus, finishing medium elements may be manufactured rapidly and conveniently.

By means of a casting process according to the second embodiment of the invention, finishing media of a variety of complex shapes can be formed in a rapid and efficient manner. This is at least in part because it is not necessary to perform a cutting operation once the melt has cooled.

It will be appreciated that once finishing medium elements according to embodiments of the invention have become spent, i.e. worn to such an extent that their effectiveness is no longer acceptable, they may be recycled to form new finishing medium elements.

Thus, spent elements may be heated and cooled to form fresh finishing medium elements. In some embodiments, spent elements are crushed to form particles that are then subjected to a heat treatment. In some embodiments the particles are placed in a mould such as that shown in FIG. 4 and subjected to a heat treatment in a similar manner to that described above.

The recycling of spent elements has the advantage of reducing wastage of material, thereby reducing a burden of the finishing process on waste disposal facilities. The fact that the raw material from which the finishing elements are formed is obtained from recycled silica glass material in the first place is also a considerable advantage in reducing the environmental impact of the process.

Figure 5:
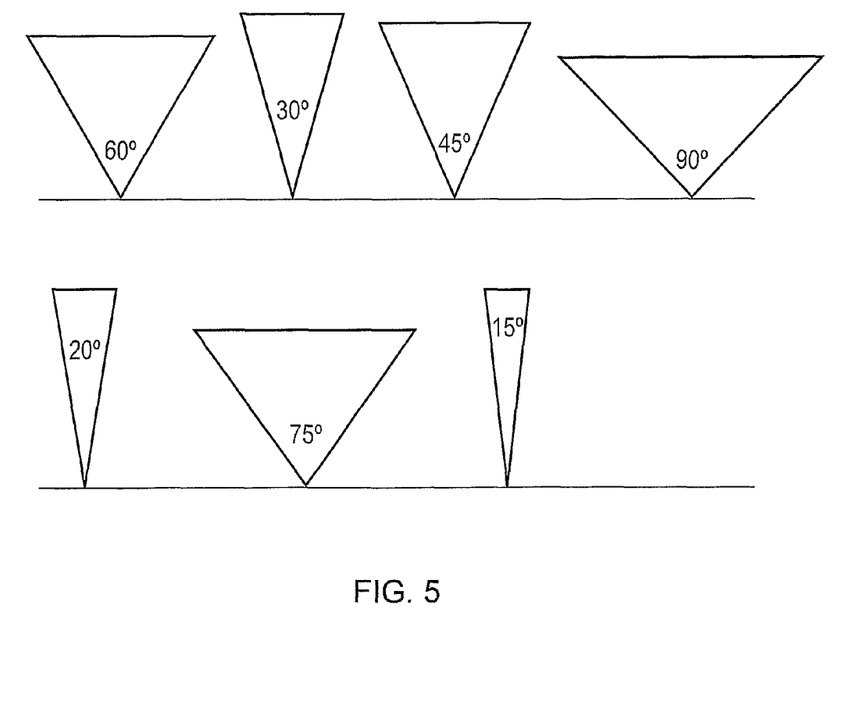
FIG. 5 shows a plurality of finishing media of conical shape having cone angles in the range from about 15° to about 90°.

FIG. 5 shows a set of finishing medium elements according to an embodiment of the invention having cone angles in the range of from around 15° to around 90°. A cone angle of up to around 120° is also useful.

An element as claimed in any preceding claim consisting essentially of a glass material and a crystallised glass material.

Figure 6:
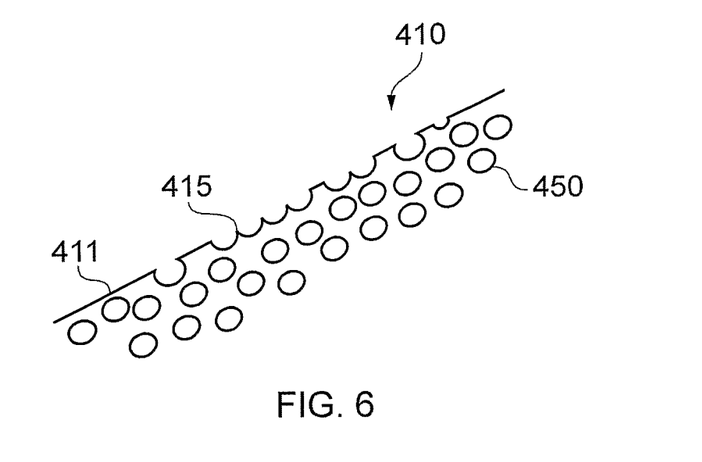
FIG. 6 is a cross-sectional view of a finishing element having an aerated structure.

FIG. 6 shows an internal structure of a finishing medium element 410 formed to have a porous or aerated structure. That is, the finishing medium element comprises a plurality of pores or voids 450. Such a structure has the advantage that an element having a free surface 411 presenting a plurality of sharp edges 415 may be provided in a convenient manner not requiring bonding of particles to a matrix. Furthermore, it is to be understood that as the finishing medium element wears in use, fresh voids are exposed at the free surface. Thus, fresh sharp surfaces are exposed as the element wears.

Furthermore, as the element wears, any shards of material breaking from the element are of relatively small size compared with the size of the elements themselves. Thus, the risk of shards blocking filters and associated fluid handling apparatus of a vibratory finishing tool is reduced relative to some known finishing medium elements and abrasive materials.

Figure 7:
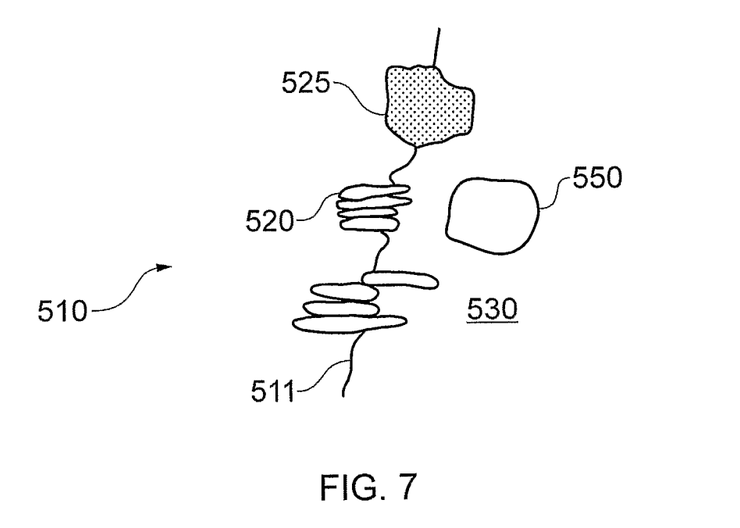
FIG. 7 is a cross-sectional view of a finishing element showing the presence of crystalline (devitrifed) material at a free surface of the element.

In some embodiments of the invention a finishing medium element comprises crystalline material exposed at a surface of the element that presents an abrasive surface to an article to be finished. In some embodiments crystalline material of the element is in the form of elongate crystals that project from an external surface of the element. FIG. 7 is a cross-sectional view of a portion of a finishing element 510 having a free surface 511. Crystalline (devitrified) material 520, 525 is present at the free surface 511, in some embodiments some of the crystalline material being in the form of elongate crystals 520 protruding from the free surface 511. Voids (or pores) 550 may also be present in the elements 510.

It is to be understood that a size of the crystals present in the finishing elements may depend upon the heat treatment applied to the glass starting material. Longer annealing times at elevated temperature typically result in the formation of larger crystals.

It is to be further understood that in some embodiments the devitrified material is present in combination with a matrix of glassy material 530 such that the crystalline material 520, 525 is effectively 'embedded' in the glassy material 530. Thus, the process of heat treating the glass results in the formation of a particle/matrix structure without a requirement to mix particles and matrix material from separate sources. The cost and complexity of the manufacturing process is thereby greatly simplified.

Thus, in some embodiments of the invention up to at least three features of a finishing element contribute to finishing of articles that contact the element. These are (i) the size of cullet used to form the finishing medium element, (ii) a size of crystals of material present in the element as determined by the time/temperature profile of the heat treatment the cullet is subjected to, and (iii) an extent to which the element has pores formed therein.

It has been found that larger pieces of cullet poured into a mould and subsequently subjected to a heat treatment whereby the cullet is sintered to form a finishing element and at least partially devitrified results in elements having a coarser surface morphology than in the case of the use of smaller pieces of cullet. Thus, larger pieces of cullet generally result in elements having a coarser surface finish that smaller pieces of cullet.

Thus, a more granular structure is provided using larger pieces of cullet, the surface of the element having undulations on a length scale larger than if smaller pieces of cullet are used.

The size of the crystals of material present in the finishing elements is largely determined by the temperature profile of a given heat treatment (i.e. the temperature of the elements as a function of time during the heat treatment). It is to be understood that larger crystals exposed at a free surface of a finishing element typically result in an element having a coarser surface morphology than an element in which smaller crystals are exposed at a free surface.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A vibratory finishing medium element comprising a solid cast member, the cast member comprising a plurality of pieces of crushed silica glass cullet heat treated to form a unitary body of at least partially devitrified glass.

2. An element as claimed in claim 1 wherein the volume of the element in the form of devitrified material is in the range of one selected from amongst around 1% to around 100% and from around 20% to around 80%.

3. An element as claimed in claim 1 having a longest dimension in the range of one selected from amongst from about 5 mm to about 80 mm, from about 5 mm to about 50 mm, and from about 10 mm to about 40 mm.

4. An element as claimed in claim 1 in the shape of at least one selected from amongst a cuboid, an ellipsoid, a prism, a cone, a tetrahedron, a pyramid, a polyhedral solid and a sphere.

5. An element as claimed in claim 1 comprising or incorporating a plurality of voids formed for example by gas bubbles, preferably air bubbles.

6. An element as claimed in claim 5 wherein the voids are substantially uniformly dispersed within the element.

7. An element as claimed in claim 5 wherein voids are provided in at least a surface layer of the element.

8. An element as claimed in claim 7 wherein voids are exposed in the surface layer thereby to present sharp edges at the surface.

9. An element as claimed in claim 7 wherein the voids are exposed at the surface thereby to provide reservoirs for fluid finishing media that may be used in a vibratory finishing process.

10. An element as claimed in claim 5 wherein the voids have a nominal diameter in the range of from around 50 nm to around 5 mm, preferably from around 1 micron to around 1 mm, more preferably around 10 microns to around 500 microns, still more preferably around 100 microns to around 500 microns.

11. An element as claimed in claim 1 comprising a plurality of regions of a crystalline material at a free surface of the element.

12. An element as claimed in claim 1 consisting essentially of an amorphous glass material and a crystallised glass material.

13. An element as claimed in claim 1 consisting of an amorphous glass material and a crystallised glass material.

14. An element as claimed in claim 12 wherein the crystallised glass material is provided in the form of particles dispersed within the amorphous glass material.

15. An element as claimed in claim 12 wherein the amorphous glass material is provided in the form of particles dispersed within the crystallised glass material.

16. An element as claimed in claim 1 consisting essentially of at least partially devitrified material, preferably glass material.

17. An element as claimed in claim 1 having a hardness value of around 5.5 on the Moh scale.

18. A method of reforming at least one finishing medium element comprising the steps of:
- providing at least one finishing medium element according to claim 1;
- fracturing the at least one finishing medium element thereby to form a plurality of pieces of material;
- subjecting the plurality of pieces of material to a heat treatment; subsequently,
- cooling to form a solid cast member comprising a devitrified material.

19. A finishing medium element as claimed in claim 1 in combination with a degreasant and/or a polishing compound.

20. A method of finishing an article comprising the steps of:
- providing a plurality of finishing medium elements as claimed in claim 1; and
- causing a plurality of the finishing medium elements to impinge against the article thereby to reduce a surface roughness of the article.

21. A method as claimed in claim 20 further comprising the steps of
- providing at least one selected from amongst a degreasing or cleaning or polishing compound thereby to enhance a reduction in surface roughness of the article.

22. A method of forming a finishing medium element comprising the steps of:
- providing a plurality of pieces of a crushed silica glass cullet;
- subjecting the pieces of cullet to a heat treatment thereby to form a solid cast member from the cullet, the heat treatment resulting in at least partial devitrification of the crushed silica glass cullet.

23. A method as claimed in claim 22 wherein the plurality of pieces of material have an average size in the range of up to around 4 mm.

24. A method as claimed in claim 22 wherein the step of heat treating the at least one piece is preceded by the step of placing the at least one piece in a mould, the mould having a shape corresponding to a shape of a finishing medium element.

25. A method as claimed in claim 24 wherein the step of heat treating is preceded by the step of placing the at least one piece in one of a plurality of moulds formed in a tray.

26. A method as claimed in claim 22 whereby the finishing medium element is formed in the shape of at least one selected from amongst a cuboid, an ellipsoid, a prism, a cone, a tetrahedron, a pyramid, a polyhedral solid and a sphere.

27. A method as claimed in claim 22 whereby the heat treatment comprises the step of heating to a temperature in the range from about 700° C. to about 1100° C.

28. A method as claimed in claim 27 whereby the heat treatment comprises the step of heating to a temperature in the range from about 700° C. to about 1100° C. for a period of from around 1 hour to around 3 hours, preferably from about 700° to about 950° C., more preferably from around 900° C. to around 920°, still more preferably around 900°.

* * * * *

UNITED STATES PATENT AND TRADEMARK OFFICE
CERTIFICATE OF CORRECTION

PATENT NO.       : 8,430,718 B2  
APPLICATION NO.  : 12/677357  
DATED            : April 30, 2013  
INVENTOR(S)      : Harrison et al.

Page 1 of 1

It is certified that error appears in the above-identified patent and that said Letters Patent is hereby corrected as shown below:

On Title Page:

Item (75), Inventors:
    Please correct "Philip James Harrison, Bradford (GB);"
        to read -- Philip James Harrison, North Lincolnshire (GB); --

Item (75), Inventors:
    Please correct "Steven Bradley Vaughan, Bradford (GB);"
        to read -- Steven Bradley Vaughan, West Yorkshire (GB); --

Item (56), U.S. Patent Documents:
    Please correct "3,820,968  6/1974  Haisty  5/33.2"
        to read -- 3,820,968  6/1974  Haisty  65/33.2 --

Item (74), Attorney, Agent, or Firm:
    Please correct "Myers Bigel Sibley & Sojovec, P.A."
        to read -- Myers Bigel Sibley & Sajovec, P.A. --

Signed and Sealed this  
Twenty-fourth Day of June, 2014

Michelle K. Lee  
*Deputy Director of the United States Patent and Trademark Office*